July 23, 1940. W. O. BROWN 2,208,787
GRATING MACHINE FOR CITRUS FRUIT AND THE LIKE
Filed Dec. 17, 1938 4 Sheets-Sheet 3
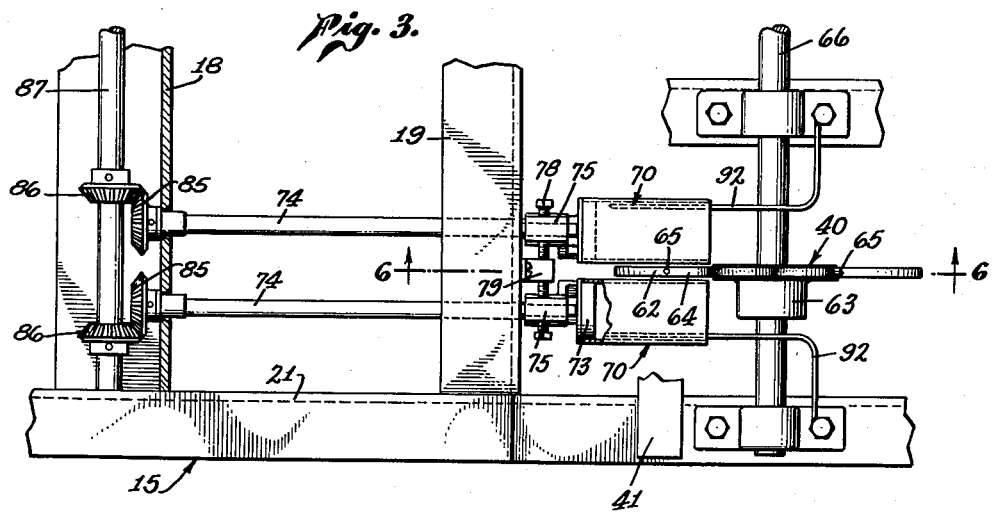
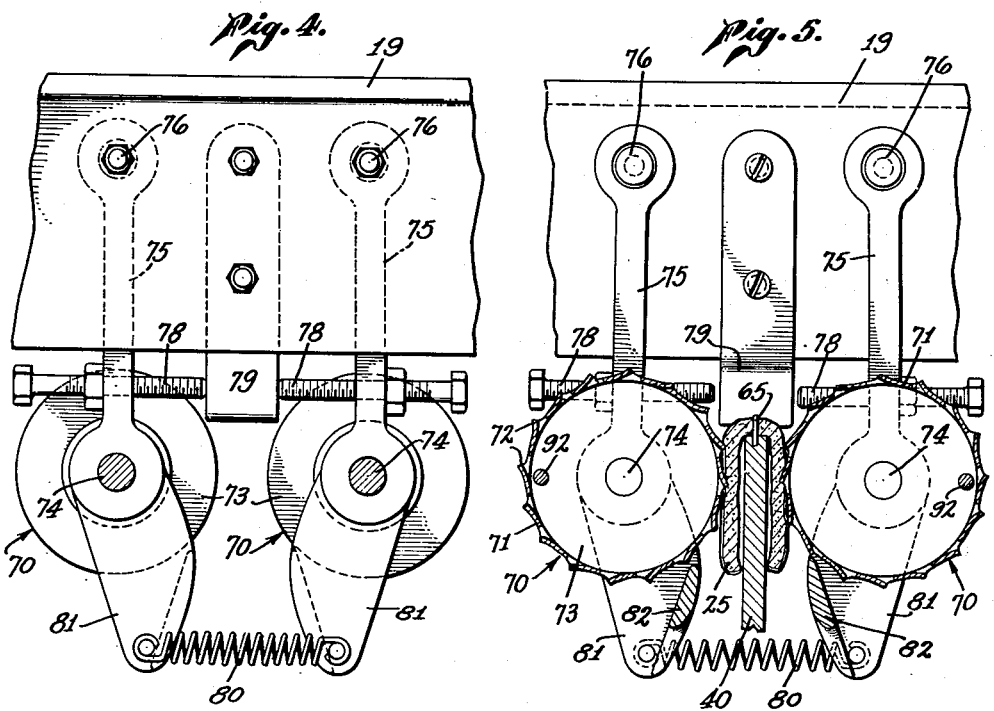
Inventor
WILLIAM O. BROWN,
By
Attorney July 23, 1940.  W. O. BROWN  2,208,787
GRATING MACHINE FOR CITRUS FRUIT AND THE LIKE
Filed Dec. 17, 1938  4 Sheets-Sheet 4
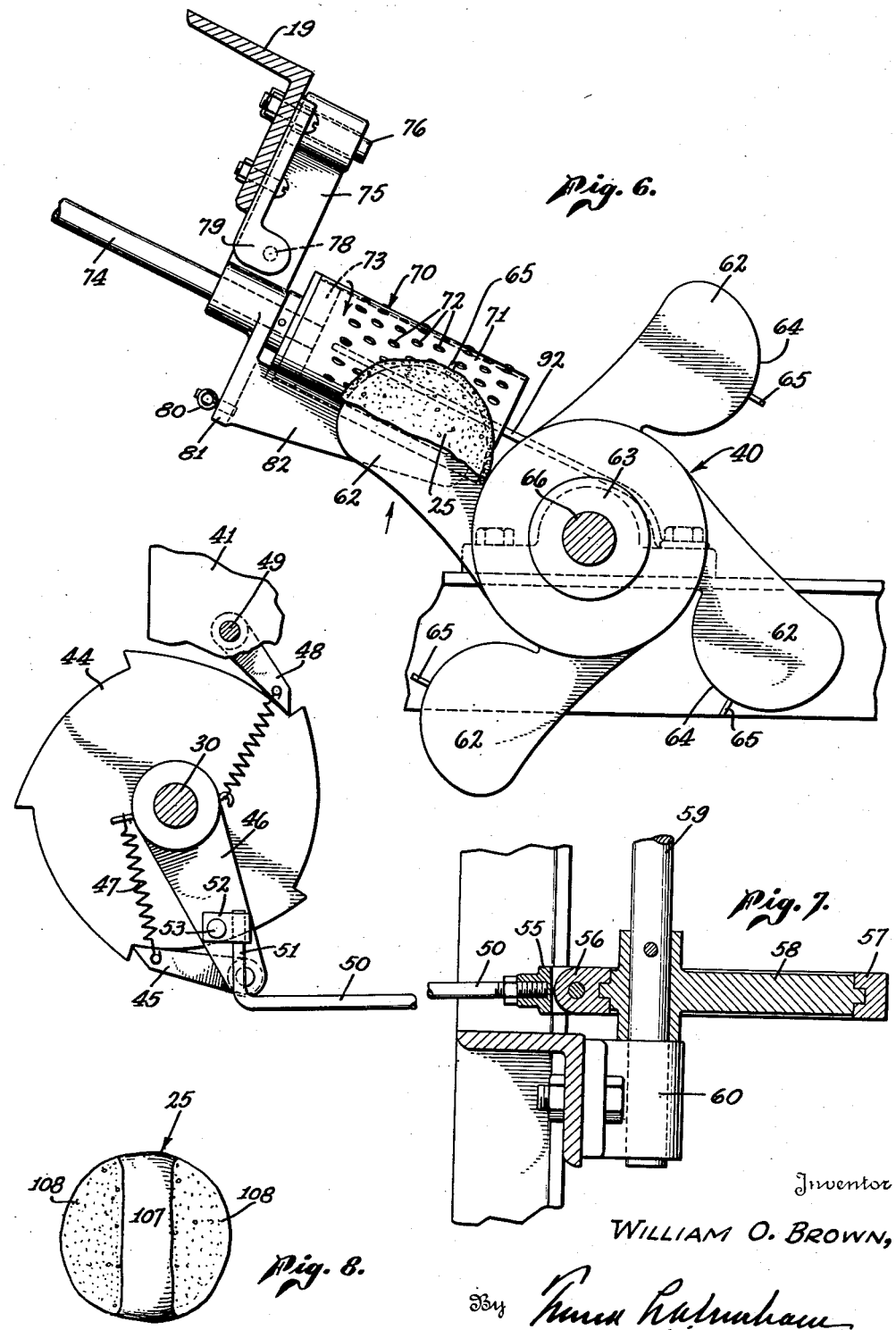
Inventor
WILLIAM O. BROWN, Patented July 23, 1940

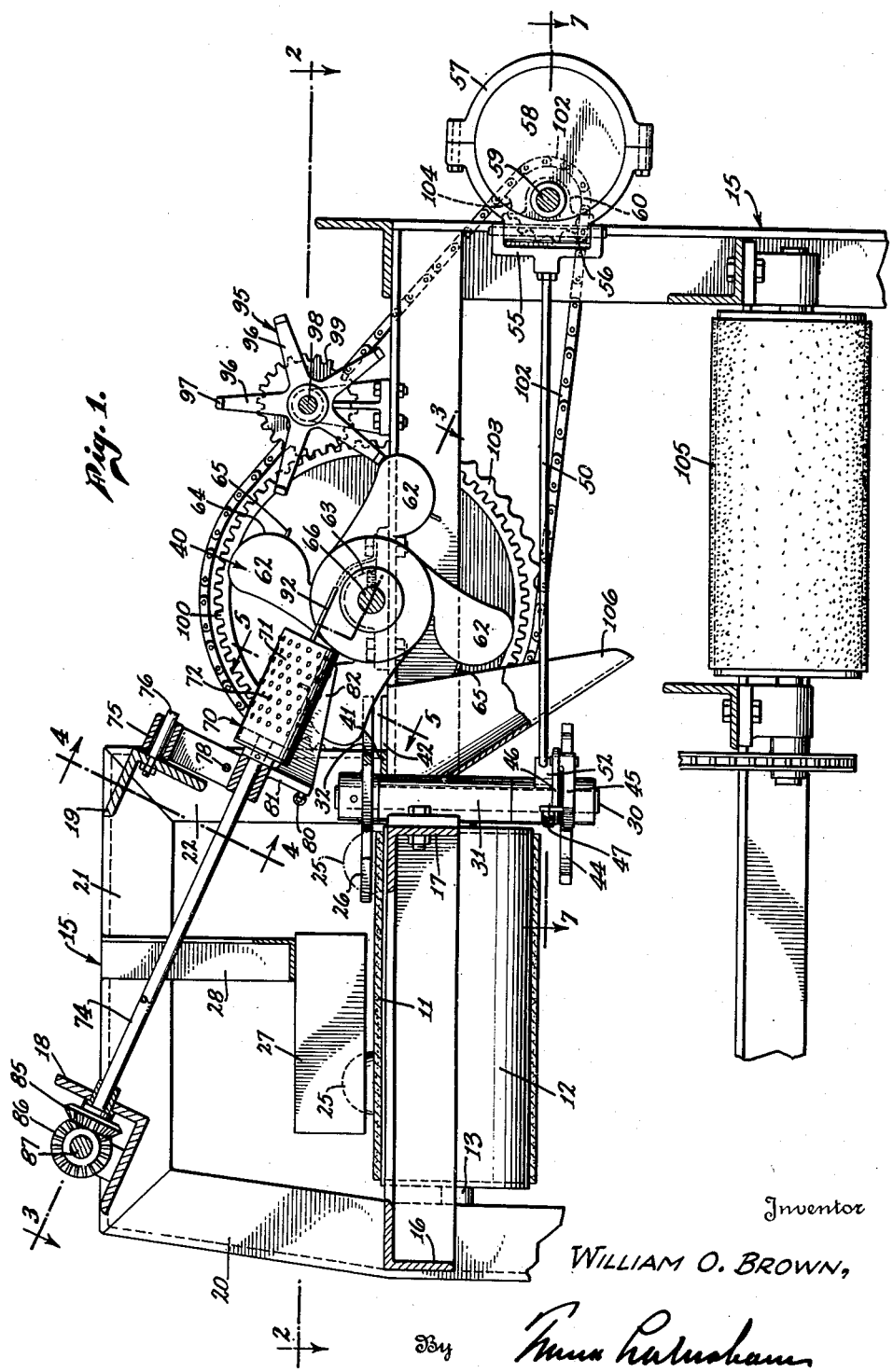

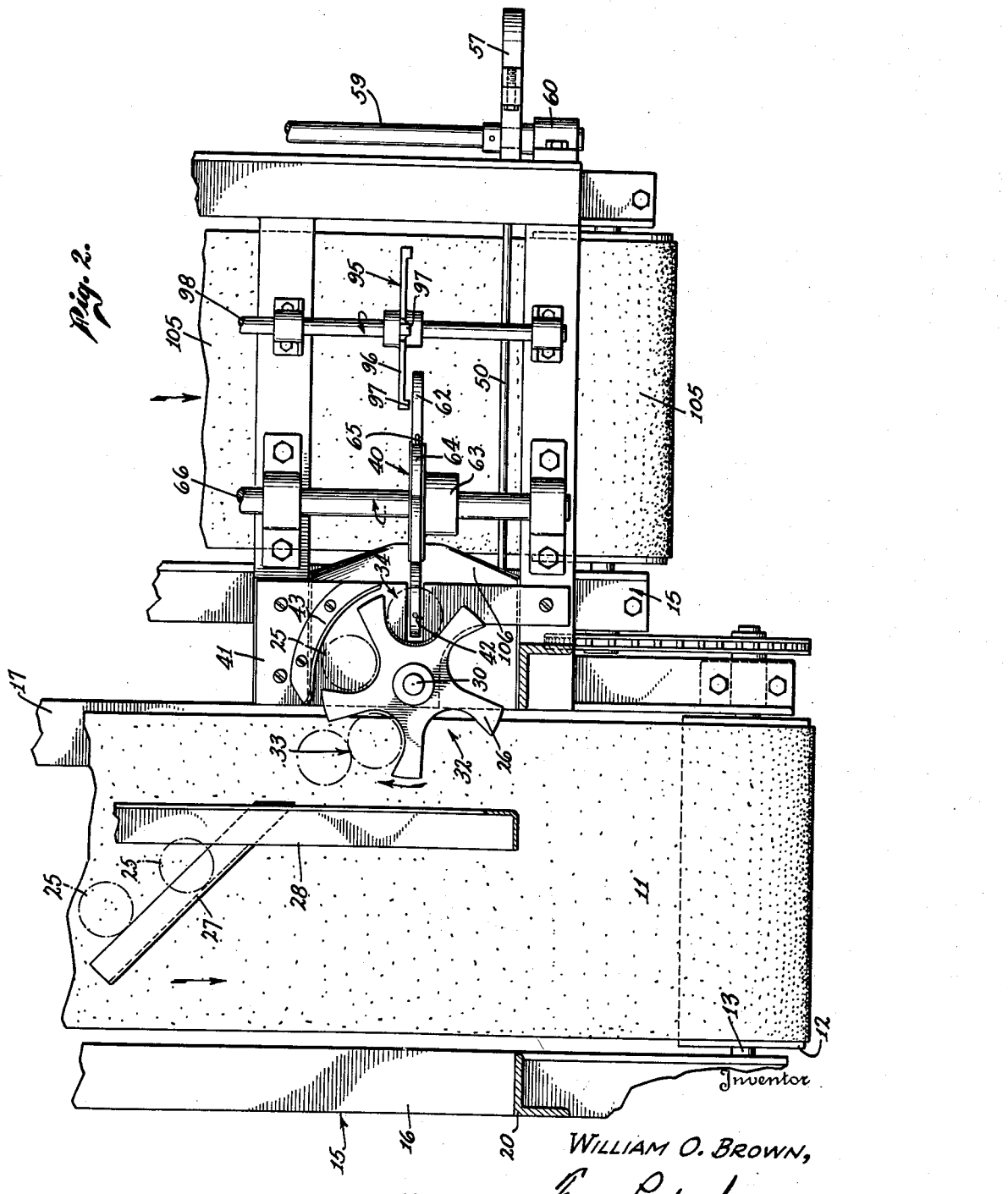

2,208,787

UNITED STATES PATENT OFFICE 2,208,787

GRATING MACHINE FOR CITRUS FRUIT AND THE LIKE

William O. Brown, West Hollywood, Calif.

Application December 17, 1938, Serial No. 246,333

8 Claims. (Cl. 146—3)

My invention relates to the art of removing the outer surface from citrus fruit rind being more particularly a machine for grating the rind of citrus fruits.

The oils obtained from the rind of citrus fruits have been used for flavoring foodstuffs and to some extent the grated outer surface of the rind has been used for this same purpose. The outer surface of the rind when removed and used in a grated condition is particularly desirable for use in the flavoring of baker's and confectioner's products and pastries. As is well known, the outer surface of the rind contains highly flavored oil somewhat different from the flavor of the citrus fruit itself and it has been found that by using this grated rind for flavoring purposes that not only is a somewhat different flavor obtained but the small particles or gratings add to the zest and piquancy of the product in which they are used and the coloring of the rind adds to the attractiveness of the product.

The use of grated rind for the purpose indicated above has been limited by reason of the fact that the grating operation, as far as I am aware, has heretofore been a manual operation requiring considerable time and effort to obtain only a small quantity of the grated material. Another feature to be considered is that grated rind of the class described should be used shortly after the same has been removed from the fruit, consequently, the manual grating operation referred to is usually performed only when the material may be required.

It is an object of this invention to provide a machine by which the rind sections may be grated at low cost and small expense in large quantities making it possible with present day forms of packaging to deliver the grated material in a fresh condition to the users as the same may be required.

Another object of this invention is to provide a machine of the character described of simple form and operation designed to operate on the by-product of juice extracting machines, that is, the rind half-sections of such fruit which at the present time are used only for other purposes.

Other objects and advantages will appear hereinafter from the following description and drawings.

Referring to the drawings, which are for illustrative purposes only—

Fig. 1 is a sectional elevation of a machine embodying my invention;

Fig. 2 is a sectional plan view on line 2—2 of Fig. 1;

Fig. 3 is a plan view partly in section on line 3—3 of Fig. 1;

Fig. 4 is a cross sectional view on line 4—4 of Fig. 1 looking in the direction of the arrows;

Fig. 5 is a cross sectional view on lines 5—5 of Fig. 1 looking in the direction of the arrows;

Fig. 6 is an enlarged sectional elevation on line 6—6 of Fig. 3;

Fig. 7 is an enlarged sectional plan view on line 7—7 of Fig. 1; and

Fig. 8 is a diagrammatic view of half a rind or rind section of a citrus fruit indicating the surface removed by the grating operation.

The machine as shown and described is particularly designed for removing the outer surface of a rind section of an orange or other citrus fruit which has been halved for the purpose of extracting the juice and pulp therefrom, such operation leaving the halved rind or rind section upon which the present machine is designed to operate.

In general the rind sections are fed to the machine from a traveling belt, the rind sections being placed upon the belt with the cut surfaces resting on the belt. These rind sections are individually removed from the belt and impaled on a revolving carrier, the path or rotation of which pass between rotating cylindrical graters which remove the outer surface of the rind section in the form of small particles of grated material.

It is to be understood that the machine as herein described may be considered as a unitary machine or as one unit of a number arranged side by side all fed from a delivery belt common to all the units.

In the drawings the numeral 11 designates a traveling belt which is shown as supported at one end on a drum 12, the shaft 13 of which is mounted on brackets supported on the frame of the machine generally indicated at 15, the other end of the traveling belt (not shown) being similarly supported and driven in any suitable manner. The frame 15 includes lower longitudinally extending members 16 and 17 and upper longitudinally extending members 18 and 19, the members 18 and 19 being supported on the upper members 20, 21 and 22, of the frame proper.

As heretofore noted the rind sections indicated at 25, are arranged on the belt 11 with their cut faces resting on the belt as indicated in Fig. 1. As the belt travels through the machine these rind sections are deflected into the path of a rotatable feed wheel 26 by means of a guide plate 27 supported on hangers 28 from the member 21 of the frame. The feed wheel 26 rotates in a horizontal plane and is secured to a shaft 30 mounted in a bearing member 31 secured to the frame member 17. As is best shown in Fig. 2, the feed wheel 26 is provided with a series of pockets 32, each pocket being of proper size to receive one of the rind sections as indicated at 33. The wheel 26 rotates in the direction of the arrow shown in Fig. 2 and brings each rind section successively into the position indicated at 34, in which position the rind section is engaged by a carrier wheel generally indicated at 40. The rind section, as it is moved from the belt 11 by the feed wheel 26, is supported by a receiving plate 41 having a slot 42 through which the carrier wheel may rotate. 43 indicates a curved guide member mounted on the plate 41 to retain the rinds in the pockets. Intermittent movement of the feed wheel 26 is accomplished by means of a ratchet wheel 44 which is secured to the shaft 30. The ratchet wheel is engaged by a dog 45 which is pivotally mounted on an arm 46 loosely mounted on the shaft 30, a coiled spring indicated at 47 being attached to the dog to yieldably hold the dog in engagement with the ratchet teeth. A detent 48 mounted on a pin 49 is provided to prevent return movement of the ratchet wheel. The arm 46 is operated through the medium of a rod 50 having its up-turned end 51 journaled in a bracket 52 which is pivotally connected to the arm 46 by a pin 53. The other end of the arm 50 is secured to a yoke 55 journaled on a bracket 56 mounted on the outer ring 57 of an eccentric 58 which in turn is mounted upon a shaft 59 supported in brackets 60 only one of which is illustrated. As the rind section is moved into the position indicated at 34 in Fig. 2, it is engaged by one of a plurality of impaling arms 62 forming part of the carrier wheel 40. These arms 62 extend outwardly from a hub 63 of the carrier wheel and are each provided with a semi-circular advancing face indicated at 64, designated to enter the rind section from below and generally conform to the inner curved face of the rind section.

For the purpose of holding the rind section from dislodgment and more properly in position to be acted upon by the graters, each impaling arm is provided with a projection or pin 65 which enters the rind section as the rind is impaled on the arm. The carrier wheel 40 is mounted on a longitudinally extending shaft 66 and the rotation of such wheel is timed with respect to the rotation of the feeding wheel 26 so that an arm thereon engages the rind section when in the position indicated at 34 in Fig. 2 and moves the same upwardly from the plate 41 and between the graters where it is yieldably engaged by the graters. It is to be noted that the graters are rotated downwardly against the rind section as it passes upwardly between the graters, thereby removing the outer surface of the rind section in fine particles. Each grater generally indicated at 70 consists of a cylindrical shell 71 provided with points or sharp projections 72 which extend outwardly from the shell a sufficient distance to remove the outer surface of the rind section. The shell 71 is mounted on a mandrel 73 secured to a shaft 74 which shaft is mounted at its forward end in a bracket 75 pivotally mounted to the frame member 19 by means of a pin or stud 76. The other or rear end of the shaft 74 is mounted in a bearing in the frame member 18, the bearing being of any suitable form to permit a slight lateral or rocking movement of the shaft therein. As illustrated and particularly shown in Figs. 1 and 3 the edge of the bearing receiving opening in the member 18 is slightly rounded to permit the angular movement of the shaft referred to. The shafts 74 with the graters thereon are angularly disposed, that is, from the member 18 the shafts extend forwardly and downwardly being so arranged as to bring the graters above the rind sections as they are fed to the carrier wheel 40 and also in a position in which the rind sections are engaged as they are moved by the carrier wheel from the plate 41 in a circular movement of the blades 62. When in inoperative position, as shown in Fig. 3, the shafts 74 are substantially parallel, a sufficient space being left therebetween to permit the passage between the graters of the impaling wheel 40. The inward movement toward each other of the graters is governed by set screws 78 which abut against a stop 79 mounted on the frame member 18. The graters are yieldably held in such position with the set screws against the stop by coil springs 80, the ends of which are attached to arms 81 extending downwardly from the brackets 75. The arms 81 are provided with forwardly extending blades 82, the edge of which extends in close proximity to the graters so that the grated material does not accumulate on the face of the grater. The rear ends of the shafts 74 are provided with beveled gears 85 which mesh with beveled gears 86 on a drive shaft 87.

The position of the graters with respect to each other is shown best in Figs. 3 to 5. In Figs. 3 and 4 the graters are in what may be termed inoperative position, that is, when not performing their function of grating the rind of the fruit, whereas in Fig. 5 the graters have moved apart sufficiently to permit the rind sections 25 to be engaged therebetween, the graters being yieldably held against the rind sections and being rotated through the medium of the shafts 74 and the gears 85 and 86 from the shaft 87. 92 represents spring fingers which extend into the inside of the graters and which also act as scrapers to remove accumulated gratings from the interior face of the grater. The spring fingers 92 are bent downwardly as shown in dotted lines in Fig. 1 where the end of each finger is secured by means of a nut or other fastening means to the frame.

After the rind section has passed through or between the graters it ordinarily drops from the blades of the carrier wheel as the same move downwardly. However, to insure removal of the rind sections from the blade a star wheel 95 is provided, the arms 96 of which are provided with lugs 97 which during the rotation of the star wheel, engage any remaining rind sections on the blades. The rotation of the star wheel through the medium of the shaft 98 upon which the same is mounted and gear 99 which meshes with gear 100 on the shaft 66 time the movement of the star wheel with respect to the carrier wheel. The rotation of the carrier wheel 40 and feed wheel 26 are timed through the medium of sprocket chain 102, sprocket wheel 103 on shaft 66 and sprocket wheel 104 on shaft 59. The rind sections as they drop from the impaling blades fall upon a belt conveyor indicated at 105, such conveyor also receiving the gratings which fall from the graters, being guided thereon by shute 106 which is secured in any suitable manner to the frame of the machine.

It will be understood from the above description that the graters being arranged parallel to each other do not engage the entire outer surface of the rind sections. They do however engage a large area of such surface. As generally indicated in Fig. 8, the circular band or central portion 107 of the rind section 25 remains ungrated and the side portions indicated at 108 have had their outer surface removed by the graters. I have found that with a machine constructed as above described that the capacity of same is such and cost of the rinds so small that the value of the product is more than ample to overcome any loss of gratings from not grating the entire surface of the rind.

I claim as my invention:

1. In a machine of the class described: a pair of cylindrical graters, a rotatable carrier; rind section receiving arms on the carrier movable between said graters; means for yieldably moving the graters against a rind section on the carrier; means for limiting such movement; and means for rotating the graters against the movement of the rind section therebetween.

2. In a machine of the class described: a pair of cylindrical graters, a rotatable carrier; rind section impaling arms on the carrier movable between said graters; means for yieldably moving the graters against a rind section on the carrier; means for limiting such movement; means for rotating the graters against the movement of the rind section therebetween; means for intermittently feeding rind sections to said rind section carrier, said feeding means comprising a rotatable feed wheel; and means for intermittently rotating said feed wheel.

3. In a machine of the class described: a pair of cylindrical graters, a rotatable carrier; rind section impaling arms on the carrier movable between said graters; means for yieldably moving the graters against a rind section on the carrier; means for limiting such movement; means for rotating the graters against the movement of a rind section therebetween; means for intermittently feeding rind sections to said rind section carrier, said feeding means comprising a rotatable feed wheel; and means for intermittently rotating said feed wheel, said rotatable feed wheel having pockets formed in its periphery each arranged to receive a single rind section therein.

4. In a machine of the class described: a traveling belt adapted to receive halved rinds with their cut face on the belt; an intermittently rotatable feed wheel extending over said belt; deflecting means above the belt arranged to move rind sections from the belt into engagement with the feed wheel; a pair of graters; means for rotating the graters; and means for moving rind sections from the feed wheel between said graters.

5. In a machine of the class described: a traveling belt adapted to receive halved rinds with their cut face on the belt; a receiving plate adjacent said belt having a slot therein; an intermittently rotatable feed wheel extending over said belt and said plate; deflecting means above the belt adapted to move the rind sections from the belt into engagement with the feed wheel; a pair of rotating graters; means for rotating the graters; and means movable through the slot in said plate for elevating a rind section into engagement with said graters therebetween.

6. In a machine of the class described: a traveling belt adapted to receive halved rinds with their cut face on the belt; a receiving plate adjacent said belt having a slot therein; an intermittently rotatable feed wheel extending over said belt and said plate; deflecting means above the belt adapted to move the rind sections from the belt into engagement with the feed wheel; a pair of rotating graters; means for rotating the graters; means movable through the slot in said plate for elevating a rind section into engagement with said graters therebetween; said last named means comprising a rotatable carrier wheel; and rind section impaling arms on said carrier.

7. In a machine of the class described: a pair of cylindrical graters longitudinally disposed side by side with a space therebetween; means for yieldably moving said graters toward each other; rind section delivery means below said graters; means for elevating the rind sections and moving the same between the graters in contact therewith; said elevating means comprising a carrier wheel; and arms on the carrier wheel each having a rind section impaling means thereon.

8. In a machine of the class described: a pair of cylindrical graters longitudinally disposed side by side with a space therebetween; means for yieldably moving said graters toward each other; rind section delivery means below said graters; means for elevating the rind sections and moving the same between the graters in contact therewith, said elevating means comprising a carrier wheel; arms on the carrier wheel each having a rind section impaling means thereon; and means for removing the grated rind sections from the arms on said carrier wheel.

WILLIAM O. BROWN.